US012561433B2

(12) United States Patent
Ezrielev et al.

(10) Patent No.: US 12,561,433 B2
(45) Date of Patent: Feb. 24, 2026

(54) TRACKING OF FILES REQUIRED FOR RUNNING MALWARE PROCESSES

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 18/300,775

(22) Filed: Apr. 14, 2023

(65) Prior Publication Data

US 2024/0346143 A1    Oct. 17, 2024

(51) Int. Cl.
    *G06F 21/56*        (2013.01)
    *G06F 21/53*        (2013.01)

(52) U.S. Cl.
    CPC ............ *G06F 21/565* (2013.01); *G06F 21/53* (2013.01); *G06F 21/566* (2013.01); *G06F 2221/034* (2013.01)

(58) Field of Classification Search
    CPC ...... G06F 21/53; G06F 21/552; G06F 21/554; G06F 21/566–568
    See application file for complete search history.

(56) References Cited

U.S. PATENT DOCUMENTS

| | | | |
|---|---|---|---|
| 2007/0150957 A1* | 6/2007 | Hartrell | H04L 63/1425 726/24 |
| 2020/0104486 A1* | 4/2020 | Strogov | G06F 21/554 |
| 2021/0209225 A1* | 7/2021 | Ghosh | G06F 21/53 |
| 2021/0349748 A1* | 11/2021 | Dunfey | G06F 3/065 |
| 2022/0027475 A1* | 1/2022 | Seth | G06F 21/53 |
| 2022/0121742 A1* | 4/2022 | Strogov | G06F 21/554 |
| 2022/0253524 A1* | 8/2022 | Gadient | G06F 11/1469 |
| 2022/0253526 A1* | 8/2022 | Sanders | G06N 3/08 |
| 2023/0229761 A1* | 7/2023 | Laplante | G06F 21/566 726/22 |
| 2023/0385415 A1* | 11/2023 | Aquilino | G06F 21/53 |
| 2024/0070261 A1* | 2/2024 | Bin Huraib | G06F 21/566 |

* cited by examiner

*Primary Examiner* — Trong H Nguyen
(74) *Attorney, Agent, or Firm* — Workman Nydegger

(57) ABSTRACT

Processes operating in a computing system are tracked. The tracking data includes or identified child processes, parent processes, and/or files associated with operation of the processes. When a process is determined to be a malware process, protective operations are performed. Protective operations may include removing or purging the malware process and all processes/files associated with the malware process in the tracking data. An infected snapshot may also be generated such that characteristics, operating procedures, and other aspects of the malware can be determined by recovering the infected snapshot to a sandbox environment and allowing the malware to execute therein.

20 Claims, 6 Drawing Sheets

500

Storage Media
508

UI Device
510

Data Storage
512

Memory
502

NVRAM
504

Processor
506

Application(s)
514

TRACKING OF FILES REQUIRED FOR RUNNING MALWARE PROCESSES

FIELD OF THE INVENTION

Embodiments of the present invention generally relate to a computing forensics system. More particularly, at least some embodiments of the invention relate to systems, hardware, software, computer-readable media, and methods for protecting data from threats including cyber threats.

BACKGROUND

Most entities rely on computing systems. These computing systems include applications and their data. Hospitals, for example, have applications that require/use/generate data related to patients, medicines, procedures, and the like. Much of this data is confidential. Airlines rely on applications and data to manage flights, passengers, employees, and more.

These entities exert substantial efforts to ensure that their data is available when needed. These efforts include generating backups of the production systems/data. Generating backups helps ensure that in the event of data loss, the production systems can be restored, and operations can resume.

Data corruption or loss, however, can occur in different ways. The loss of a disk drive due to hardware failure, for example, can usually be quickly resolved. The loss of data (e.g., inability to access the data) due to malware or other cyber threats can be much more problematic.

Malware that infects a production system, for instance, can cause severe problems in the entity's operations as the data may not be accessible. In addition to infecting production systems, malware may also infect backups. Recovering from malware can be complicated, difficult, and costly due to the potentially unknown effects of the malware. Further, the delay associated with recovering the production system may be further delayed when law enforcement or insurance companies are involved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection systems and data protection operations. More particularly, at least some embodiments of the invention relate to systems, hardware, software, computer-readable media, and methods for detecting and/or responding to malware and other cyber-attacks.

In general, example embodiments of the invention relate to data protection operations including, but not limited to, data protection operations, backup operations, snapshot operations, restore/recover operations, point-in-time backup/recover operations, malware response operations, malware evaluation operations, malware detection operations or the like or combinations thereof.

The term malware as used herein and by way of example, may refer to ransomware, viruses, rootkits, spyware, adware, trojans, worms, phishing attacks, or other unwanted software or cyber-attacks. Malware may also be referred to as a computing process or application.

Embodiments of the invention relate to a forensic engine, or a forensics kit configured to evaluate, detect and/or respond to malware. When malware is detected in a production system (or in a backup), the forensic engine may perform a snapshot or other backup of the production system. The snapshot, which includes the malware, is an infected snapshot and may be deployed to a forensics environment such that the forensic engine can attempt to learn how the malware operates, how the production system was infected, or the like. U.S. Ser. No. 17/937,882 filed Oct. 4, 2022, which is incorporated by reference in its entirety, describes aspects of a forensic engine. The forensic engine allows the malware to operate in an observed manner such that operational characteristics of the malware can be learned and evaluated. This may include determining how and when files are altered (e.g., deleted, changed, encrypted), how and where data is sent by the malware, how the malware spreads, how the malware responds to anti-malware software, how the malware tries to avoid detection, how the malware infects backups, and the like.

Embodiments of the invention allow the forensic engine to learn these operational characteristics or other behavior. While learning the operational characteristics or after learning the operational characteristics, the forensic engine may be configured to operate in a proactive manner. For example, the forensic engine can trick or cause the malware to send a response malware back to the malware's source. The forensic engine may also emulate communications of the malware. The forensics engine may be able to mitigate, or reverse damage caused by the malware in the production system.

Figure 1:
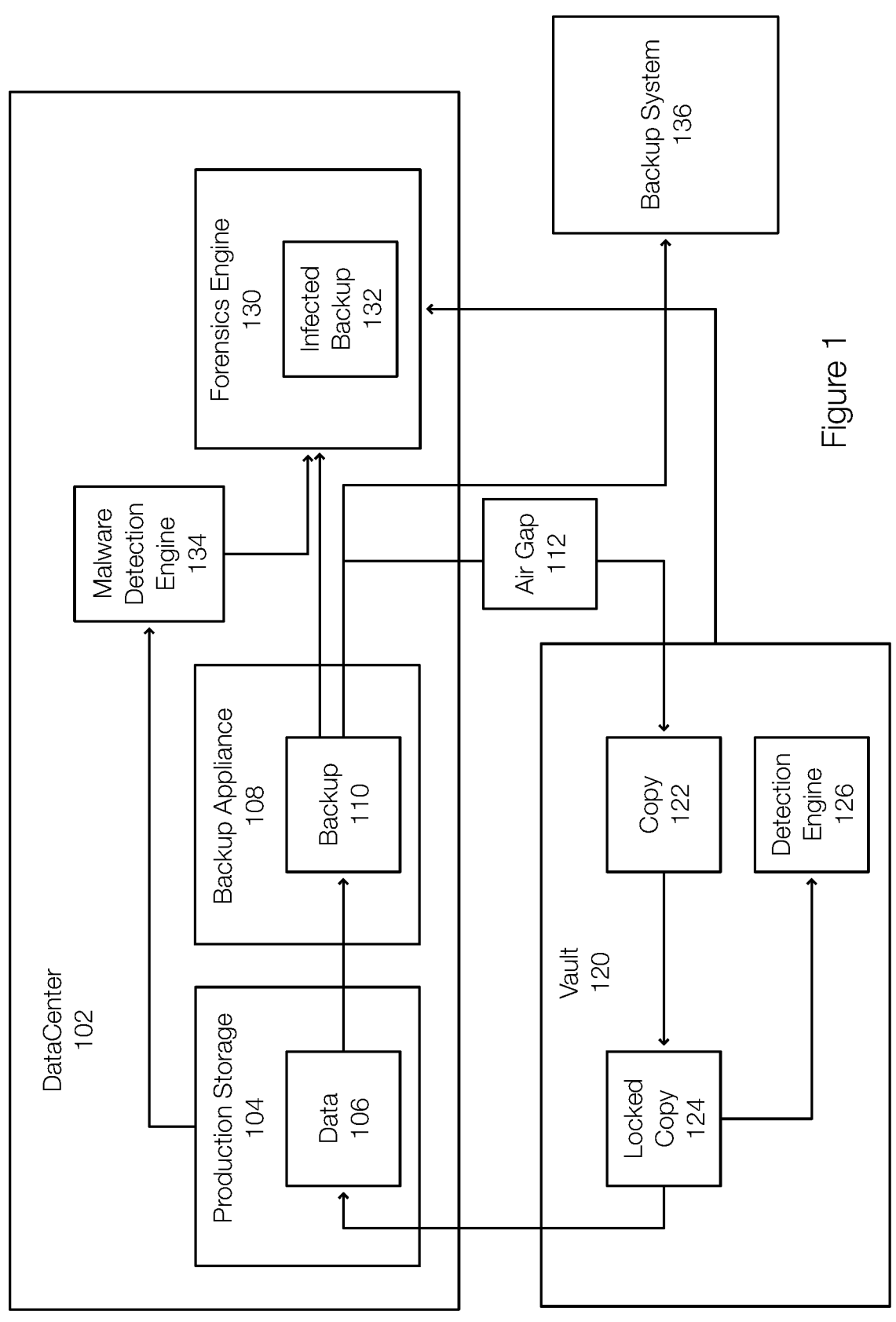
FIG. 1 discloses aspects of a forensic engine or kit configured to perform data protection operations including learning operations performed by a malware and responding to the malware.

FIG. 1 discloses aspects of a forensic engine configured to perform data protection operations including malware related operations. FIG. 1 illustrates a datacenter 102 that includes production storage 104, which stores production data 106. The datacenter 102 may also host applications associated with the data 106. The production data 106 may include data required or accessed by users, applications, or the like. The data 106 may include files, objects, blocks, a database, emails, images, videos, documents, spreadsheets, presentations, or the like or combination thereof.

Although FIG. 1 illustrates production storage 104 of a datacenter 102, the production storage 104 may be an on-premise storage system, an edge system storage, a cloud-based system or the like or combination thereof. The production storage 104 may include storage devices such as hard disk drives.

A backup appliance 108 is configured to generate and store backups of the data 106 (and/or applications), represented as the backup 110. The backup 110 may be or include a full backup, a synthetic backup, incremental backups, snapshots, or the like. The backup appliance 108 may be a virtual appliance or a physical appliance. The backup appliance 108 may coordinate with other backup appliances at remote locations. This allows backups to be stored remotely.

More generally, the backup appliance 108 may protect data, applications, or the like. The backup appliance 108 may transmit the backup 110 to a vault 120, which may be protected by an air gap 112 controlled by the vault 120. This allows a copy 122 (e.g., a backup) of the data 106 to be stored in the vault 120 only when a connection is available (e.g., the air gap 112 is configured to allow communications). After ingestion into the vault 120, the copy 122 is locked to generate a locked copy 124. The locked copy 124 is immutable in one example. The vault 120 may be created in the datacenter 102 or in another location that is remote from the data 106 and/or the backup appliance 108. In other examples, backups may be stored in storage systems that are not protected by an air gap mechanism. For example, the backup appliance 108 may regularly transmit backups to a backup system 136 in the cloud or other location.

During a recovery operation, the data 106 may be recovered from the locked copy 124 (or other backup in the vault 120) or from the backup system 136. In some examples, the data 106 may be recovered from the copy 122 if necessary. In one example, the backup 110 may be a namespace that is backed up to a namespace in the vault 120. The backup 110 may be transmitted to a namespace in the vault 120 as the copy 122. Next, the copy 122 may be copied to another namespace and retention locked, which results in the locked copy 124.

The air gap 112 may not be required but provides a more secure backup environment. Once the locked copy 124 is generated and retention locked, the immutability is guaranteed in one example. For example, the locked copy 124 is secure from attack vectors that adversely impact backups because the vault 120 may not be accessible, due to the air gap 112, which is controlled from inside the vault 120 in one example.

In one example, the vault 120 may be a target site configured to store backups received from the backup appliance 108. The vault 120 may be associated with a corresponding appliance that may be configured to store the backups in the target site and also perform restore or recover operations. In one example, the air gap 112 is not present and the value 120 may simply represent backup storage that stores backups received from the backup appliance 108.

The production storage 104 (or more generally the production system) may be associated with a malware detection engine 134 (malware engine 134). When the malware engine 134 detects malware in the production storage 104 or in the production system, the malware engine 134 may trigger the forensic engine 130 and/or perform other protective operations. The forensic engine 130 may be triggered in another manner or may include the malware engine 134.

When triggered, the forensic engine 130 may generate a snapshot (e.g., a point-in-time snapshot) or backup of the production system, which is illustrated as an infected backup 132. The infected backup 132 may be taken from the data 106, may be a PiT copy generated from the backup 110, or the like. In this example, the infected backup 132 may represent different types of backups.

Figure 2:
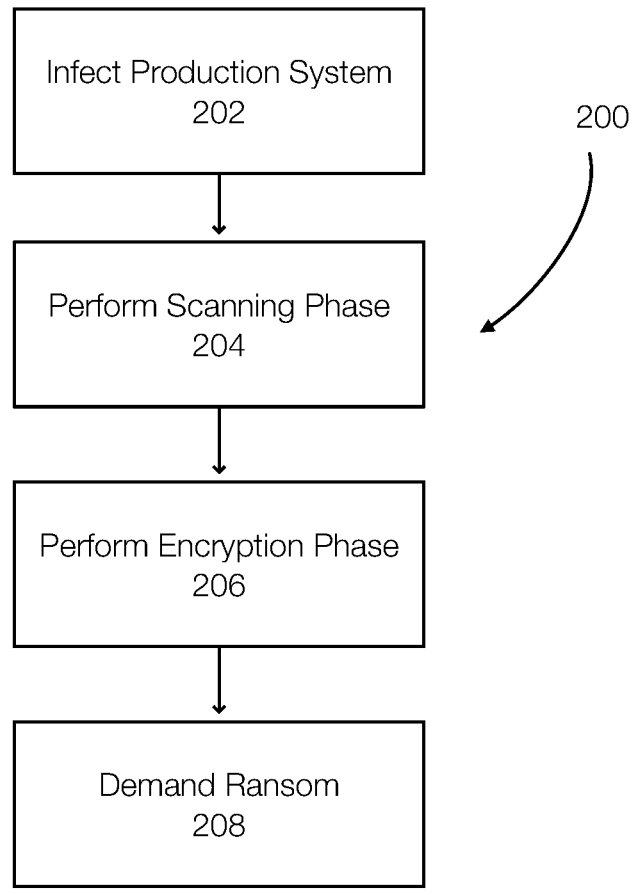
FIG. 2 discloses aspects of operational phases of a malware application or process.

FIG. 2 discloses aspects of malware operations. For example, ransomware is an example of malware that is configured or designed to block/prevent users from accessing their data until a ransom is paid. Ransomware is a significant concern for users everywhere. Embodiments of the invention are directed to detecting malware such as ransomware in real time or near real time in order to prevent or mitigate damage to the production system.

As illustrated in the method 200, malware, such as ransomware, may infect 202 a production system. Malware may gain access to the production system in different manners such as when a user visits an infected website, opens a malicious attachment or email, sends login information to a phishing site, or the like. Once the malware gains access to or infects a production system, the malware may operate in various phases. In a simple example, malware such as ransomware may simply begin encrypting data. This is possible because encryption functionality is often part of an operating system. Thus, the ransomware only needs to access the files, encrypt the files with an attacker-controlled key, and replace the original files with the attacker controlled encrypted files.

Malware variants may be more cautious in selecting files to encrypt or may generate a plan prior to encrypting the data. This may be performed to ensure system stability. More specifically, the malware may perform 204 a scanning phase 204. A scanning phase 204 may allow the malware to identify files that appear to have higher value, select files to encrypt, generate a mapping of files to encrypt, determine an order in which to encrypt files, or the like. During this or other phases of operation, some malware may delete backup and shadow copies of files to make recovery without the decryption key more difficult. The scanning phase may also include attempts to infect other computing systems or the like. For example, a malware may gain access to a production data system and spend time trying to access an accounting system or spread to other unrelated computing systems.

Once the malware has scanned the production system and completed the scanning phase, an encryption phase may be performed 206. The encryption phase may be representative of various forms of attack. In another example, the malware may corrupt data (e.g., partially delete, partially overwrite). As previously stated, this may be performed using an attacker-controlled key and encryption functionality of the operating system. Once the files are encrypted or otherwise compromised, a ransom may be demanded 208. The malware may only encrypt the targeted files or perform other operations in the infected computing system.

Embodiments of the invention include a malware detection engine that is configured to track processes operating the computing system. This may include tracking processes operating in a user space and/or a kernel space. More specifically, the malware detection engine (or a tracking engine included in the malware detection engine) may track various aspects of each process. For example, if a process spawns or creates a new process, that information is tracked with respect to the process being tracked. More generally, parent/child relationships are tracked by the malware detection engine. If a process creates files, the files are tracked. If a process moves files to a new location, deletes files and creates new files, or the like, these actions are tracked. This allows tracking data to be associated with each process operating in the computing system. When a process is determined to be malicious, the tracking data allows the malicious process and all related processes/files to be identified and purged. In one example, the files include files associated with the malware or associated with operation of the malware. This may include files created by the malware, files rewritten and/or renamed by the malware process, or the like. Advantageously, this avoids spending time required to identify processes/files that may be related or associated with the malicious process. This may also allow infected backups to be quickly identified and sanitized, discarded, or the like. Thus, embodiments of the invention further relate to protection or protective operations performed when a malware process has been identified. Malware may be detected in various manners such as disclosed, by way of example only, in U.S. Ser. No. 18/189,928, filed Mar. 24, 2023, RANSOMWARE DETECTION USING INODE TRAVERSAL SCORING; U.S. Ser. No. 18/295,027, filed Apr. 3, 2023, MALWARE DETECTION VIA TRACING CALLS RATE TO OBTAIN FILE ATTRIBUTES; U.S. Ser. No. 18/194,725, filed Apr. 3, 2023, RANSOMWARE DETECTION VIA DETECTING SYSTEM CALLS PATTERN IN ENCRYPTION PHASE; U.S. Ser. No. 18/194,624, filed Apr. 1, 2023, RANSOMWARE DETECTION VIA MONITORING OPEN FILE OR PROCESS; U.S. Ser. No. 18/188,643, filed Mar. 23, 2023, DATA-LEAKAGE PREVENTION FOR PRE-RANSOMWARE'S ENCRYPTION ACTIVITY VIA TERMINATION OF NETWORK-SYSCALL COMMANDS USING INTERCEPTION ANALYSIS; U.S. Ser. No. 18/295,366, filed Apr. 4, 2023, RANSOMWARE DISCOVERY BY DETECTION OF TRANSMIT/OVERWRITE PROCESSES; U.S. Ser. No. 18/188,625, filed Mar. 23, 2023, DETECTION OF RANSOMWARE ACTIVITY BASED ON OS PAGINATION FUNCTIONALITY, which applications are incorporated by reference in their entirety.

When a malware process is discovered, protective operations may be performed to purge the malware process. In one example, the executable of the malware process is located and the files used by the malware process, spawned by the malware process, related to the process and/or controlling the malware process are identified and removed, stopped or the like.

To minimize or reduce the ability of the malware process to take counteractive measures (e.g., during the time required to discover related files/processes), embodiments of the invention track related process/file information in the tracking data. This allows a static code analysis to be performed on the process identified as malware (specifically on the tracking data) and allows the malware process and related malware processes/files to be removed or stopped. For example, a malware process that becomes aware of its discovery or suspects that discovery is imminent may delete files and create new files. By tracking related process/file information, all files that are required, used, associated with a malware process can be removed, stopped, or purged.

Figure 3A:
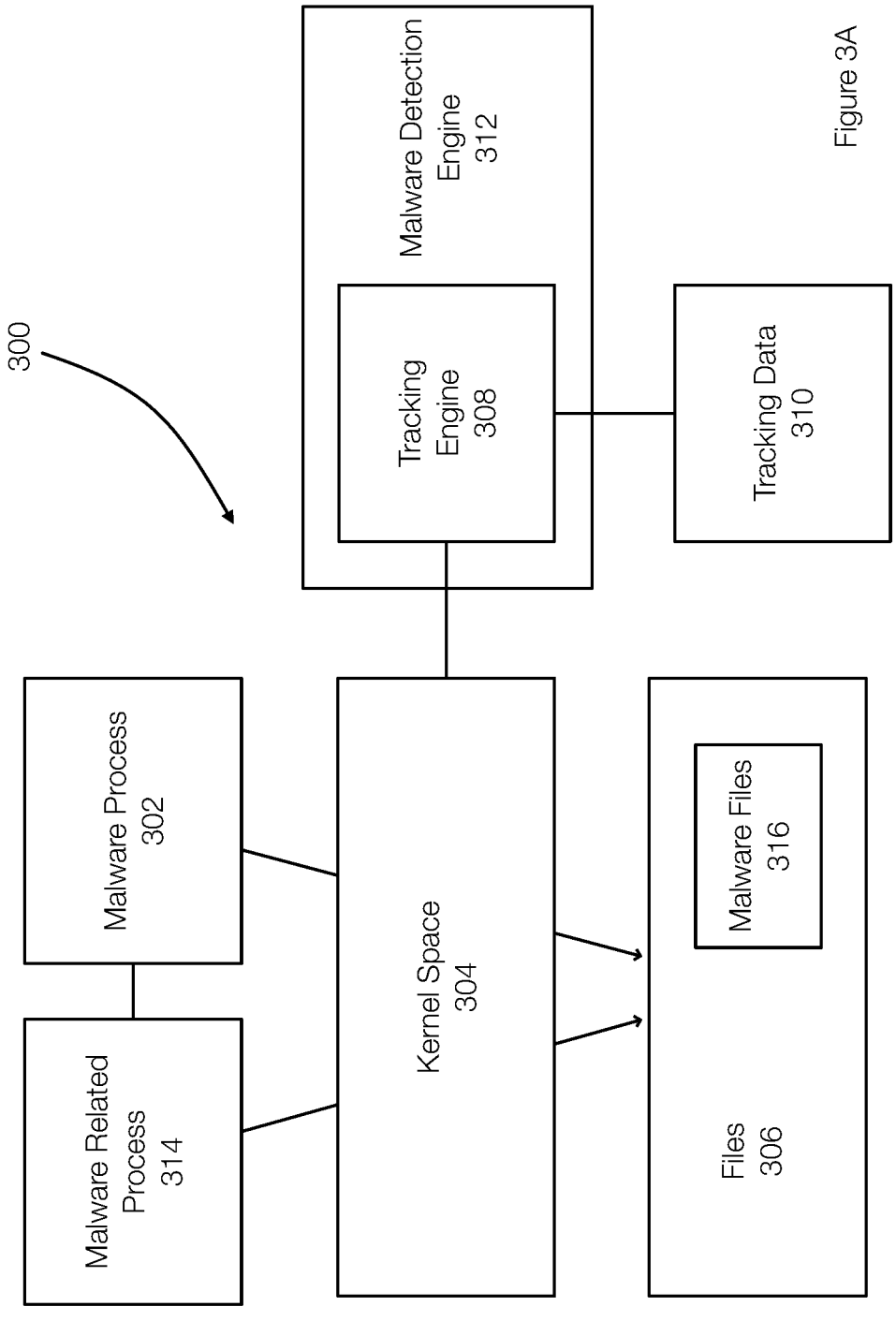
FIG. 3A discloses aspects of tracking a malware process in a computing system.

FIG. 3A discloses aspects of tracking a process such that protective actions can be performed when a process is determined to be a malware process. FIG. 3A is discussed from two perspectives. The first perspective relates to a situation where the process is not identified as malicious. In other words, prior to detection, the malware process 302 is simply a process operating in the computing system that is not identified as malicious. More specifically, the process 302 is labeled as a malware process 302 in FIG. 3A. However, until the malware process 302 is determined to be malware or is suspected of being malware, the malware process 302 is simply a process from the perspective of the malware detection engine or to the computing system.

In FIG. 3A, the malware process 302 may be performing undetected malicious operations in the computing system 300. For example, the malware process 302 may issue system calls that are received and performed by the kernel space 304 with respect to the files 306.

The malware process 302 may perform various actions. For example, during operation, the malware process 302 may create a malware related process 314. The tracking engine 308, which is part of a malware detection engine 312, may track that the malware process 302 has created a malware related process 314. The tracking engine 308 may determine that the malware process 302 has written files in the files 306. When the malware process 302 is initially installed or instantiated, for example, various files may be created or written in the computing system 300. The tracking engine 308 may also track these files and relate them to the malware process 302. If these files are moved, deleted and rewritten, or the like, this information is included in the tracking data 310. The tracking data 310 represents the tracking data captured and recorded by the tracking engine 308 included in the malware detection engine 312.

The second perspective occurs when the malware detection engine 312 determines that the malware process 302 is a malicious process. In this case, the malware detection engine 312 can stop, delete, or purge (or other protective operation) the malware process 302. The malware detection engine 312 also accesses the tracking data 310 to stop delete, and/or purge the files/processes associated with the malware process. Thus, the malware related process 314 and malware files 316 are deleted, purged, or the like.

Advantageously, because this information is tracked and included in the tracking data 310, the time that would otherwise be spent identifying the malware related processes/files is avoided. Upon the discovery or determination that the malware process 302 is malicious, the malware process and related processes/files (the malware related process 314 and malware files 316) can be immediately deleted, purged, or the like.

Figure 3B:
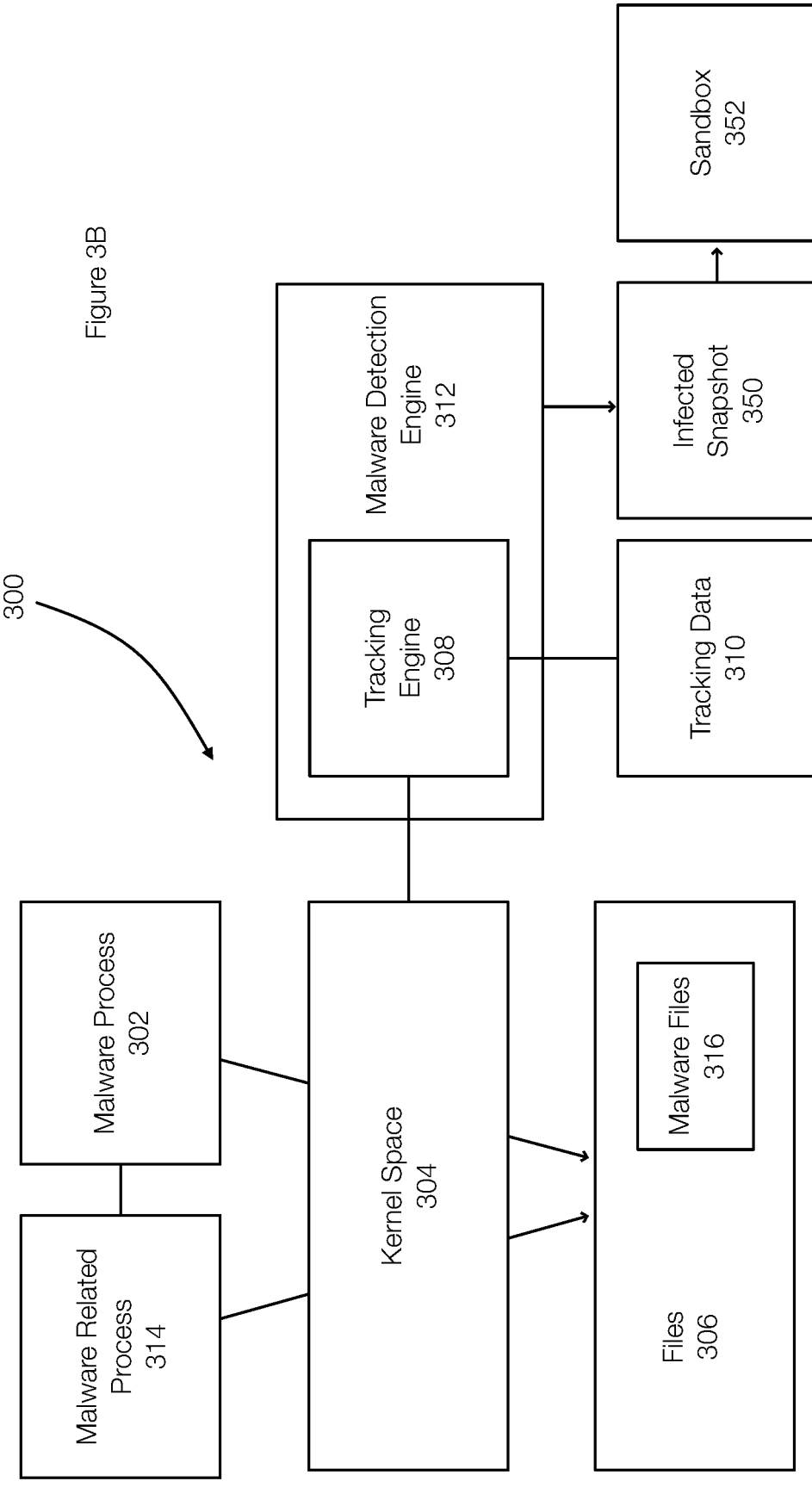
FIG. 3B discloses additional aspects of tracking a malware process in a computing system.

FIG. 3B discloses additional aspects of protection operations that are performed upon discovering malware in a computing system. As previously stated, the malware process 302 is a malicious process but this may not be confirmed or determined in the computing system. In FIG. 3B, the malware detection engine 312, upon determining that the malware process 302 is in fact malicious or upon determining that the malware process 302 may be malicious, may also trigger or perform a backup operation to generate a snapshot 350. The snapshot 350, in this example, is an infected backup of the computing system 300 (e.g., of the data/applications) that includes the malware process 302, the malware related process 314, and the malware files 314.

In another example, the protection operations may be performed when the malware detection engine suspects that the malware process 302 may be malware. Examples of determining that a process may be a malware process or is suspected to be a malware process are disclosed in U.S. Ser. No. 18/295,336, filed Apr. 4, 2023, INTEGRATION OF INLINE MALWARE DISCOVERY AND OFFLINE VAULT RANSOMWARE PREDICTION, which is incorporated by reference in its entirety.

In some examples, processes may perform actions that may be related to a threshold score. In one example, a first threshold score is associated with determining that a process is malware. A second threshold score, which is different (e.g., lower or higher depending on the scoring mechanism) from the first threshold score is associated with suspecting that a process is malware. When an action is performed that is suspicious (e.g., repeatedly accessing files, performing a pattern of system calls) the score of the process is increased. When the score of a process exceeds the second threshold score, the process is suspected to be malicious. The protection operations performed in response to suspecting a process to be malware may vary or be different from the protection operations performed when the process is determined to be malware. A suspected malware process may or may not be treated differently from a process that is determined to be malicious. For example, a suspected malware process may be paused while files that have been accessed are evaluated while a malware process is stopped and purged. Of course, any of the protection operations disclosed herein may be performed for processes suspected to be malware processes and processes determined to be malware processes.

The infected snapshot 350 can be recovered from the vault 120 or the backup system 136 to a sandbox 352. This infected snapshot 350, when recovered to and running in the sandbox 352, can be used to analyze and learn about the malware process 302 and its related processes/files such as the malware related process 314 and malware files 316. In effect, the malware detection engine 312 ensures that malware, when detected, can be efficiently and quickly purged from the computing system 300 and, at the same time, analyzed in a sandbox 350.

This is beneficial at least because processes such as the malware process 302, the malware related process 314, and the malware filed 316 may not be subject to a protection policy. Generating a snapshot 350 that includes the malware process 302 and related processes/files, and the like can generate understanding into the operation of the malware process 302 and/or other malware variants or operating protocols that may not be generally known.

Figure 4:
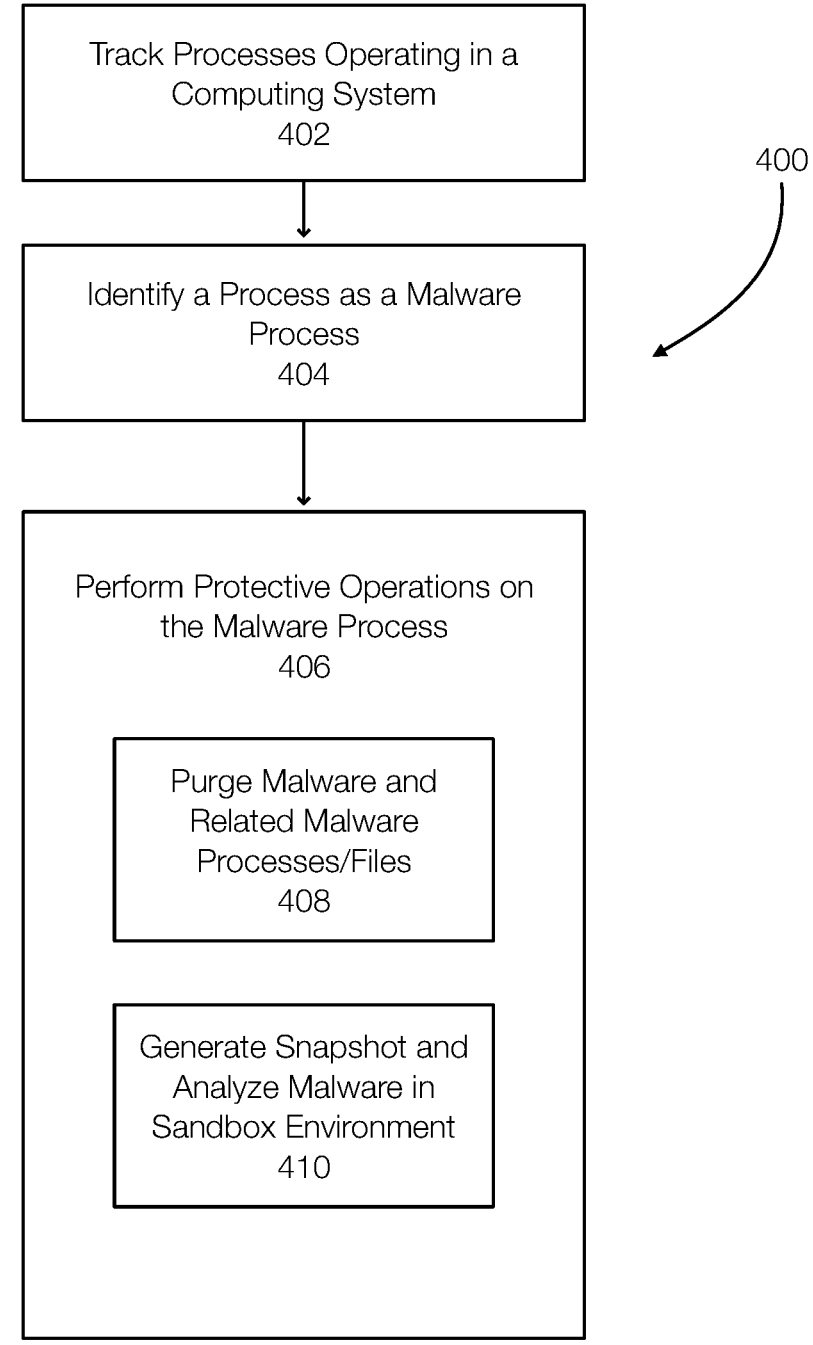
FIG. 4 discloses aspects of a method for tracking malware in a computing system and of performing protective operations when malware is detected.

FIG. 4 discloses aspects of a method for performing protective operations in a computing environment when malware is detected. The method 400 includes tracking 402 processes operating in a computing system. Tracking processes includes identifying all processes related to the process (as parent and/or child), identifying all files created or used by the process, or the like. Tracking each process allows potentially evasive actions to be countered. For example, a malicious process may delete its files and write the files to a new location with new names. This would be included in the tracking data such that the related files of the process can be identified quickly.

While the malware detection engine is tracking processes operating in the computing environment, a process may be identified 404 as a malware process. When the process is identified as malicious, protective operations are performed 406 on or with respect to the malware process. This may include stopping the malware process, revoking privileges of the malware process, quarantining the malware process, purging the malware process or the like.

In addition, protective operations are performed 408 with respect to the processes/files included in the tracking information associated with the identified malware process. Thus, protective operations may include purging 408 malware related processes and files using the tracking information or tracking data.

Another protective operation may include generating 410 a snapshot. Because the snapshot includes the malware process and related processes/files, the snapshot is an infected snapshot that will not be used for recovery operations. However, evaluation and analysis operations may be performed by recovering the infected snapshot to a sandbox or forensic environment. In the sandbox environment, the malware is allowed to operate unhindered. The characteristics and operations of the malware can then be learned and used for subsequent data protection related operations. In other words, insights into the operation of the malware can be learned by operating the malware in a sandboxed environment.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, malware detection operations, malware response operations, malware deployment operations, file locking operations, kill operations, file kill detection operations, or the like or combinations thereof. Further operations may include data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the PowerProtect CyberRecovery and associated data protection software, and storage environments such as the Dell-EMC DataDomain or PowerProtect storage environments. In general, however, the scope of the invention is not limited to any particular data backup platform or data storage environment. New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: monitoring, by a malware detection engine, a process operating in a computing system, wherein actions performed by the process are identified in tracking data, determining that the process is a malware process or is suspected of being the malware process, performing protective operations on the malware process in the computing system, and performing protective operations on processes related to the malware process and files associated with using the tracking data.

Embodiment 2. The method of embodiment 1, wherein monitoring the process includes tracking the actions, wherein the tracking data identifies the related processes, wherein the related processes include child processes of the malware process and parent processes of the malware process.

Embodiment 3. The method of embodiment 1 and/or 2, wherein the files identified in the tracking data include files associated with operation of the malware process, wherein the files associated with the operation of the malware process include files created by the malware process, files moved by the malware process, files renamed by the malware process, or combinations thereof.

Embodiment 4. The method of embodiment 1, 2, and/or 3, wherein the protective operations include purging the malware process, the child processes, the parent processes, and the files associated with the malware process.

Embodiment 5. The method of embodiment 1, 2, 3, and/or 4, wherein the malware detection engine operates in a kernel space of the computing system.

Embodiment 6. The method of embodiment 1, 2, 3, 4, and/or 5, further comprising generating an infected snapshot that includes the malware process, child processes of the malware process, parent processes of the malware process, and files associated with operation of the malware process.

Embodiment 7. The method of embodiment 1, 2, 3, 4, 5, and/or 6, further comprising recovering the infected snapshot to a sandbox environment.

Embodiment 8. The method of embodiment 1, 2, 3, 4, 5, 6, and/or 7, further comprising running the malware process unhindered in the sandbox environment.

Embodiment 9. The method of embodiment 1, 2, 3, 4, 5, 6, 7, and/or 8, further comprising learning characteristics, operating protocols, and operations of the malware process from operating the malware process in the sandbox environment.

Embodiment 10. The method of embodiment 1, 2, 3, 4, 5, 6, 7, 8, and/or 9, further comprising monitoring all processes operating in the computing system, generating tracking data for each of the processes, and performing the protection operations when any of the processes is determined to be a malicious process.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-12.

Embodiment 13. A system comprising a processor and memory configured to perform the operations, methods, or processes, or any portion of any of these, or any combination thereof disclosed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
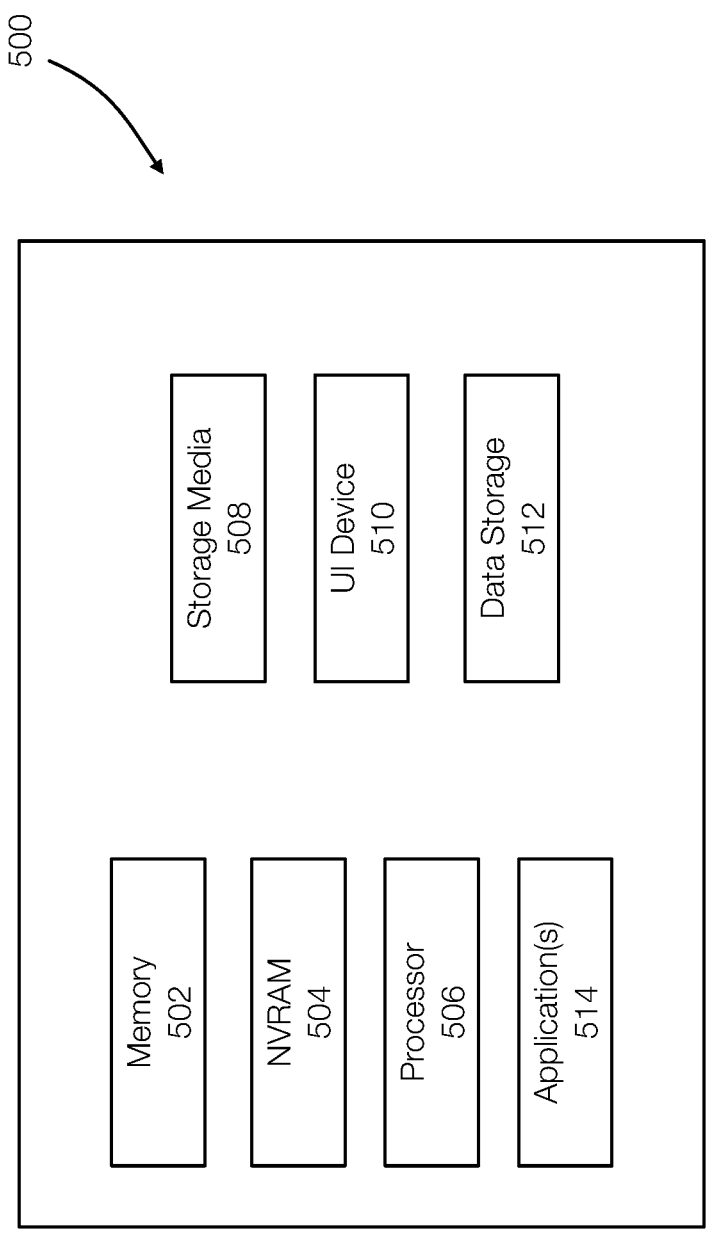
FIG. 5 discloses aspects of a computing device, system, or entity.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random-access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

monitoring, by a malware detection engine, a process operating in a computing system, wherein actions performed by the process are identified in tracking data, wherein the tracking data identifies child processes and parent processes related to the process, and all files created or used by the process, the child processes, and the parent processes;

determining that the process is a malware process or is suspected of being the malware process, wherein suspecting that the process is the malware process corresponds to a first threshold score and determining that the process is the malware process corresponds to a second threshold score that is different from the first threshold score, and wherein different protective actions are performed depending on whether the process is suspected to be the malware process or is determined to be the malware process;

in response to determining that the process is the malware process, purging the malware process from the computing system; and in response to determining that the process is the malware process, purging the child processes and the parent processes identified in the tracking data that are related to the malware process, and purging all files required for running the malware process and all the files created or used by the malware process, the child processes, and the parent processes identified by the tracking data.

2. The method of claim 1, wherein the monitoring the process includes tracking the actions, wherein the tracking data identifies the related processes, wherein the related processes include the child processes of the malware process and the parent processes of the malware process.

3. The method of claim 2, wherein the files identified in the tracking data include files associated with operation of the malware process, wherein the files include files moved by the malware process, the child processes and the parent processes, files renamed by the malware process, the child processes and the parent processes, or combinations thereof.

4. The method of claim 3, wherein purging further comprises purging, based on the tracking data, executable files and configuration files required for running the malware process, including executable files and configuration files created, moved, or renamed by the malware process, the child processes, or the parent processes, while preserving non-executable user data files not identified by the tracking data.

5. The method of claim 3, wherein the malware detection engine operates in a kernel space of the computing system.

6. The method of claim 1, further comprising generating an infected snapshot that includes the malware process, the child processes of the malware process, the parent processes of the malware process, and the files associated with operation of the malware process, the child processes, and the parent processes.

7. The method of claim 6, further comprising recovering the infected snapshot to a sandbox environment.

8. The method of claim 7, further comprising running the malware process unhindered in the sandbox environment.

9. The method of claim 8, further comprising learning characteristics, operating protocols, and operations of the malware process from operating the malware process in the sandbox environment.

10. The method of claim 1, further comprising monitoring all processes operating in the computing system, generating the tracking data for each of the all processes, and performing the protective operations when any of the all processes is determined to be a malicious process.

11. A non-transitory storage medium having stored therein instructions that are executable by one or more hardware processors to perform operations comprising:

monitoring, by a malware detection engine, a process operating in a computing system, wherein actions performed by the process are identified in tracking data, wherein the tracking data identifies child processes and parent processes related to the process, and all files created or used by the process, the child processes, and the parent processes;

determining that the process is a malware process or is suspected of being the malware process, wherein suspecting that the process is the malware process corresponds to a first threshold score and determining that the process is the malware process corresponds to a second threshold score that is different from the first threshold score, and wherein different protective actions are performed depending on whether the process is suspected to be the malware process or is determined to be the malware process;

in response to determining that the process is the malware process, purging the malware process from the computing system; and in response to determining that the process is the malware process, purging the child processes and the parent processes identified in the tracking data that are related to the malware process, and purging all files required for running the malware process and all the files created or used by the malware process, the child processes, and the parent processes identified by the tracking data.

12. The non-transitory storage medium of claim 11, wherein the monitoring the process includes tracking the actions, wherein the tracking data identifies the related processes, wherein the related processes include the child processes of the malware process and the parent processes of the malware process.

13. The non-transitory storage medium of claim 12, wherein the files identified in the tracking data include files associated with operation of the malware process, wherein the files include files moved by the malware process, the child processes and the parent processes, files renamed by the malware process, the child processes and the parent processes, or combinations thereof.

14. The non-transitory storage medium of claim 13, wherein purging further comprises purging, based on the tracking data, executable files and configuration files required for running the malware process, including executable files and configuration files created, moved, or renamed by the malware process, the child processes, or the parent processes, while preserving non-executable user data files not identified by the tracking data.

15. The non-transitory storage medium of claim 13, wherein the malware detection engine operates in a kernel space of the computing system.

16. The non-transitory storage medium of claim 11, further comprising generating an infected snapshot that includes the malware process, the child processes of the malware process, the parent processes of the malware process, and the files associated with operation of the malware process, the child processes, and the parent processes.

17. The non-transitory storage medium of claim 16, further comprising recovering the infected snapshot to a sandbox environment.

18. The non-transitory storage medium of claim 17, further comprising running the malware process unhindered in the sandbox environment.

19. The non-transitory storage medium of claim 18, further comprising learning characteristics, operating protocols, and operations of the malware process from operating the malware process in the sandbox environment.

20. The non-transitory storage medium of claim 11, further comprising monitoring all processes operating in the computing system, generating the tracking data for each of the all processes, and performing the protective operations when any of the all processes is determined to be a malicious process.

* * * * *